United States Patent Office — 3,407,240, Patented Oct. 22, 1968

3,407,240
METHOD FOR INHIBITING POLYMERIZATION OF CONJUGATED DIENES
Tatsuo Sakashita, Kamakura-shi, and Taketami Sakuragi, Tokyo, Japan, assignors to The Japanese Geon Co., Ltd., Chiyoda-ku, Tokyo, Japan
No Drawing. Filed Sept. 18, 1967, Ser. No. 668,650
Claims priority, application Japan, Sept. 22, 1966, 41/62,326
9 Claims. (Cl. 260—666.5)

ABSTRACT OF THE DISCLOSURE

Inhibitors found effective against polymerization of conjugated $C_4$–$C_5$ diolefins at 80–150° C. dissolved in dimethyl formamide include acrylonitrile, nitromethane, morpholine, thiophenol, $\alpha$-nitroso-$\beta$-naphthol, cinnamic aldehyde, aldol, and isatin. Especially effective is addition of two inhibitors in which the second inhibitor is another of those listed or a previously known inhibitor.

---

This invention relates to a method of reducing the tendency of conjugated dienes, e.g. butadiene, isoprene and/or 1,3-pentadiene, to polymerize in solutions when exposed to elevated temperatures.

It is known to use the techniques of solvent absorption and extractive distillation in processes for separating the valuable industrial raw material butadiene in good yield and high purity from a butadiene-containing gas mixture such as the so-called $C_4$-hydrocarbon fraction the chief constituents of which are, for example, n-butane, isobutane, n-butenes, isobutene, butadiene, etc. Further it is well known to use the same techniques in processes for separating isoprene or 1,3-pentadiene in good yield and high purity from isoprene and/or 1,3-pentadiene-containing gas mixture such as the so-called $C_5$-hydrocarbon fractions the chief constituents of which are, for example, isoprene, 1,3-pentadiene, n-pentane, isopentane, pentene-1, pentene-2, 2-methylbutene-1, 2-methylbutene-2, cyclopentadiene, etc. It is also known that typical solvents used in these processes include acetonitrile, dimethylformamide, acetone and N-methylpyrrolidone. In the operation of these processes, however, the solvent containing the conjugated diene, e.g. butadiene, isoprene or 1,3-pentadiene is necessarily exposed to elevated temperatures, e.g. from 80° to 150° C. or even higher, with the consequence that the conjugated diene in the solvent tends to polymerize. As a result, difficulties arise from the clogging of the apparatus with the separating polymer and the formation of a polymeric coating on the inside wall of the apparatus, and continuous operation over an extended period of time becomes practically impossible.

At room temperature or lower, the polymerization of conjugated dienes may be prevented to some extent by addition of a conventionally known polymerization inhibitor, e.g. hydroquinone, 4-t-butyl-catechol, $\beta$-naphthyl amine, methylene blue, sodium nitrite, etc. However, the polymerization inhibitors named above are not satisfactory in preventing polymerization of conjugated dienes when these dienes are subjected to heat treatment at a relatively high temperature over a long period.

After considerable research, the present inventors have found that the incorporation of at least one compound selected from $\alpha,\beta$-unsaturated nitriles, aliphatic nitro compounds, aromatic mercaptans, cinnamic aldehyde, aldol, $\alpha$-nitroso-$\beta$-naphthol, isatin and morpholine into a conjugated diene-containing solution reduces the tendency of the conjugated diene to polymerize. In particular, it has been found that little or no polymerization of butadiene, isoprene or 1,3-pentadiene occurs when the solution is exposed to elevated temperatures. This is so even in the presence of iron rust which is generally believed to promote the polymerization of butadiene, isoprene or 1,3-pentadiene at elevated temperatures. Further, this invention enables the prevention of polymerization of butadiene, isoprene or 1,3-pentadiene even when water is present in a solution containing these conjugated dienes. The term "1,3-pentadiene" used herein should be understood to mean both cis- and trans-1,3-pentadienes and the term "butadiene" used herein should be understood to mean 1,3-butadiene.

Accordingly the present invention provides a method of reducing the tendency of butadiene, isoprene and/or 1,3-pentadiene to polymerize in solutions exposed to elevated temperatures, which comprises adding to the solution, as a polymerization inhibitor, one of the above-named compounds. The invention also include a butadiene, isoprene or 1,3-pentadiene solution containing, as a polymerization inhibitor, one of the above-named compounds.

The invention is particularly applicable to butadiene, isoprene or 1,3-pentadiene solutions wherein the solvent is a typical solvent used in the separation of butadiene, isoprene or 1,3-pentadiene from butadiene-, isoprene- or 1,3-pentadiene-containing gas mixtures by solvent absorption or extractive distillation, as discussed hereinbefore. By means of the invention, it is, therefore, possible to separate butadiene, isoprene or 1,3-pentadiene stably and continuously over an extended period of time from the mixed gases containing butadiene, isoprene or 1,3-pentadiene by means of the solvent absorption and extractive distillation processes, without employing apparatus made from such expensive materials as stainless steel.

Although the amount of the polymerization inhibitor compound used is capable of wide variations depending upon such factors as the class of solvent, the water content of the solvent, operating conditions and the presence or absence of iron rust, in general it is satisfactory to incorporate 0.01–10%, preferably 0.05–5%, based on the weight of the solvent. It is however, possible to add higher proportions if desired, as no particular detrimental effects are observed.

Suitable $\alpha,\beta$-unsaturated nitriles can be generically expressed by the formula $R_1CH=C(R_2)CN$, wherein $R_1$ is hydrogen, phenyl, $C_1$–$C_6$-alkyl or $C_1$–$C_6$-alkenyl, $R_2$ is hydrogen or $C_1$–$C_4$-alkyl which may be substituted with a CN, $NO_2$, SH or OH group. Especially preferred as the $\alpha,\beta$-unsaturated nitriles are acrylonitrile, methacyclonitrile, cinnamic nitrile, crotononitrile, $\alpha$-cyanoethyl acrylonitrile, etc.

Suitable aliphatic nitro compounds can be expressed by the formula $R_3NO_2$ wherein $R_3$ is a $C_1$–$C_8$-alkyl or $C_1$–$C_8$-alkenyl. Typical compounds are, for example, nitromethane, nitroethane, 2-nitropropane, nitroethylene, 2-nitrobutene-1, nitrohexane, etc.

Suitable aromatic mercaptans used herein can be expressed by the formula

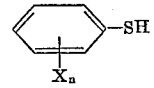

wherein X is —$NH_2$, halogen, —COOH, $COOR_4$ (in which $R_4$ is a $C_1$–$C_4$-alkyl), $OCH_3$, SH, $NO_2$ or $C_1$–$C_4$-alkyl and $n$ is an integer from 0 to 2. Typical compounds are, for example, thiophenol, o-thiocresol, dithioresorcinol, p-aminothiophenol, m-chlorothiophenol, thiosalicyclic acid, ethyl thiosalicylate, p-methoxythiophenol, p-nitrothiophenol, etc.

Other compounds useful as a polymerization inhibitor according to the invention are cinnamic aldehyde, aldol, $\alpha$-nitroso-$\beta$-naphthol, isatin and morpholine.

The above-specified polymerization inhibitors may be used singly or in combination. It is also possible to use these polymerization inhibitors together with a conventionally known polymerization inhibitor such as furfural, benzaldehyde or an aromatic nitro compound, thereby to have an increased effect for the prevention of undesired polymerization.

The effect of the polymerization inhibitor according to the invention is further promoted by the cojoint presence in the system of substances which are well-known for use as polymerization inhibitors or stabilizers of unsaturated compounds. The conventional amounts, or less, of such substances may be used. Presumably, this is the result of a synergistic action between these substances and the additive used in accordance with the present invention. Known substances of this class include, for example, sodium nitrite, hydroquinone, methylene blue, sulphur, phenolic compounds such as tertiary butyl catechol, and aromatic amines such as $\beta$-naphthylamine.

It is to be noted that the solvent solutions containing butadiene, isoprene and/or 1,3-pentadiene can be equally prevented from polymerization by the incorporation of the polymerization inhibitor according to the present invention. Further, their polymerization inhibiting effect does not decrease at all even in the presence of acetylenes such as methyl acetylene, vinyl acetylene, propyl acetylene, or allenes such as 1,2-butadiene. More specifically, polymer formation can be inhibited by adding the polymerization inhibitor to a solution containing the acetylenes or allenes in addition to butadiene, isoprene and/or 1,3-pentadiene. The polymerization inhibitors according to the invention are also effective in the presence of saturated hydrocarbons such as butane, n-pentane and iso-pentane, monoolefins such as butene-1, isobutene, pentene-1, pentene-2 and 2-methylbutene-1, and cyclopentadiene. Accordingly, the incorporation of these polymerization inhibitors into the so-called $C_4$- or $C_5$-hydrocarbon fraction is completely effective to inhibit undesired polymerization of butadiene or isoprene and 1,3-pentadiene.

The present invention will now be explained in detail in conjunction with the following examples.

Example 1

A glass tube was charged with dimethyl formamide and the various compounds in the amounts hereinafter indicated. Butadiene was introduced to a gauge pressure of 6 kg./cm.$^2$, while maintaining a temperature of 155° C. On examining the solutions 48 hours later, the following results were obtained.

| Sample No. | Additive | State of Solution |
|---|---|---|
| (1) | None | Large amount of polymer separated. |
| (2) | Sodium nitrite (500 p.p.m.) | Turbid. |
| (3) | Hydroquinone (10,000 p.p.m.) | Do. |
| (4) | Methylene Blue (10,000 p.p.m.) | Large amount of polymer separated. |
| (5) | 4-t-butylcatechol (10,000 p.p.m.) | Polymer separated. |
| (6) | Cinnamic aldehyde (5 vol. percent) | Slightly turbid. |
| (7) | Aldol (5 vol. percent) | Do. |
| (8) | Acrylonitrile (5 vol. percent) | Practically transparent. |
| (9) | α-Cyanoethylacrylonitrile (1 vol. percent) | Slightly turbid. |
| (10) | Methacrylonitrile (5 vol. percent) | Do. |
| (11) | α-Nitroso-,-Naphthol (10,000 p.p.m.) | Practically transparent. |
| (12) | Thiophenol (0.5 vol. percent) | Transparent. |
| (13) | Thiosalicylic acid (5,000 p.p.m.) | Practically transparent. |
| (14) | Isatin (5,000 p.p.m.) | Turbid. |
| (15) | Morpholine (5 vol. percent) | Do. |
| (16) | Nitromethane (1 vol percent) | Perfectly transparent. |
| (17) | Nitroethane (2 vol. percent) | Do. |
| (18) | 2-nitropropane (3 vol. percent) | Transparent. |

Example 2

An autoclave having iron rust present on its inside wall was charged with dimethylformamide and the various compounds in the amounts hereinafter indicated. Butadiene was introduced to a gauge pressure of 6 kg./cm.$^2$, while maintaining a temperature of 155° C. The mixtures were in contact with the iron rust. On examining the solutions 48 hours later, the following results were obtained.

| Sample No. | Additive | State of Solution |
|---|---|---|
| (1) | None | Large amount of polymer separated. |
| (2) | Cinnamic aldehyde (5 vol. percent) | Slightly turbid. |
| (3) | Aldol (5 vol. percent) | Do. |
| (4) | α-Nitroso-β-naphthol (10,000 p.p.m.) | Transparent. |
| (5) | Isatin (5,000 p.p.m.) | Do. |
| (6) | Morpholine (1 vol. percent) | Turbid. |
| (7) | Acrylonitrile (5 vol. percent) | Slightly turbid. |
| (8) | α-Cyanoethylacrylonitrile (1 vol. percent) | Transparent. |
| (9) | Methacrylonitrile (5 vol. percent) | Do. |
| (10) | Thiophenol (5,000 p.p.m.) | Do. |
| (11) | Thiosalicylic acid (5,000 p.p.m.) | Do. |
| (12) | Nitromethane (1 vol. percent) | Perfectly transparent. |
| (13) | Nitroethane (5 vol. percent) | Slightly turbid. |

Example 3

An autoclave having iron rust present on its inside wall was charged with dimethylformamide and the various compounds in the amounts hereinafter indicated. Butadiene was introduced to a gauge pressure of 5.5 kg./cm.$^2$, while maintaining a temperature of 155° C. The mixtures were in contact with the iron rust. On examining the solutions 40 hours later, the following results were obtained.

| Sample No. | Additive | State of Solution |
|---|---|---|
| (1) | None | Large amount of polymer separated. |
| (2) | Sodium nitrite (200 p.p.m.) | Turbid. |
| (3) | Sulfur (500 p.p.m) | Polymer separated |
| (4) | Hydroquinone (500 p.p.m.) | Do. |
| (5) | Methylene Blue (500 p.p.m.) | Do. |
| (6) | β-Naphthyl amine (500 p.p.m.) | Do. |
| (7) | 4-t-butylcatechol (500 p.p.m) | Do. |
| (8) | Cinnamic aldehyde (5 vol. percent; Hydroquinone (500 p.p.m.) | Transparent. |
| (9) | Cinnamic aldehyde (5 vol. percent; Sulfur 500 p.p.m.) | Practically transparent. |
| (10) | Aldol (5 vol. percent); β-Naphthyl amine (500 p.p.m.) | Slightly turbid. |
| (11) | Acrylonitrile; 4-t-butylcatechol (500 p.p.m.) | Do. |
| (12) | α-Nitroso-β-Naphthol (10,000 p.p.m.); Hydroquinone (500 p.p.m.) | Transparent. |
| (13) | α-Nitroso-β-Naphthol (10,000 p.p.m.); Methylene Blue (500 p.p.m.) | Do. |
| (14) | Thiophenol (0.5 vol. percent); Hydroquinone (500 p.p.m.) | Do. |
| (15) | Thiophenol (0.5 vol. percent); Methylene Blue (500 p.p.m.) | Do. |
| (16) | Isatin (5000 p.p.m.); Sulfur (500 p.p.m.) | Practically transparent. |
| (17) | Isatin (5000 p.p.m.); Hydroquinone (500 p.p.m.) | Transparent. |
| (18) | Nitromethane (1 vol. percent); 4-t-butylcatechol (500 p.p.m.) | Do. |
| (19) | Nitromethane (1 vol. percent); Sodium nitrite (200 p.p.m.) | Do. |

Example 8

An autoclave having iron rust on its inside wall was charged with acetonitrile and various additives in the amounts hereinafter indicated. While maintaining a temperature of 120° C., butadiene was introduced to a gauge pressure of 7 kg./cm.$^2$. After 20 hours, the states of the solutions were observed with the following results.

| Sample No. | Additive | State of Solution |
|---|---|---|
| (1) | None | Polymer separated. |
| (2) | Cinnamic aldehyde (5 vol. percent) | Slightly turbid. |
| (3) | Aldol (5 vol. percent) | Do. |
| (4) | Acrylonitrile (5 vol. percent) | Do. |
| (5) | Methacrylonitrile (5 vol. percent) | Do. |
| (6) | α-Cyanoethylacrylonitrile (3 vol. percent) | Transparent. |
| (7) | Thiophenol (1 vol. percent) | Do. |
| (8) | Thiosalicylic acid (10,000 p.p.m.) | Do. |
| (9) | Nitromethane (1 vol. percent) | Do. |
| (10) | Nitroethane (1 vol. percent) | Practically transparent. |
| (11) | 2-nitropropane (1 vol. percent) | Slightly turbid. |
| (12) | α-Nitroso-β-naphthol (10,000 p.p.m.) | Transparent. |
| (13) | Isatin (10,000 p.p.m.) | Do. |
| (14) | Morpholine (5 vol. percent) | Practically transparent. |

Example 9

The autoclave used in Examples 2–8 was charged with N-methylpyrrolidone and various additives in the amounts hereinafter indicated. While maintaining a temperature of 120° C., isoprene was introduced to a gauge pressure of 3.5 kg./cm.$^2$. The mixtures were in contact with the iron rust. After 20 hours, the states of the solutions were observed with the following results.

| Sample No. | Additive | State of Solution |
|---|---|---|
| (1) | None | Large amount of polymer separated. |
| (2) | Sodium nitrite (500 p.p.m.) | Turbid. |
| (3) | Hydroquinone (10,000 p.p.m.) | Polymer separated. |
| (4) | 4-t-butylcatechol (10,000 p.p.m.) | Turbid. |
| (5) | Aldol (5 vol. percent) | Slightly turbid. |
| (6) | Cinnamic aldehyde (5 vol. percent) | Do. |
| (7) | Acrylonitrile (5 vol. percent) | Practically transparent. |
| (8) | α-Cyanoethylacrylonitrile (3 vol. percent) | Transparent. |
| (9) | Methacrylonitrile (5 vol. percent) | Do. |
| (10) | α-Nitroso-β-naphthol (10,000 p.p.m.) | Do. |
| (11) | Thiosalicylic acid (10,000 p.p.m.) | Do. |
| (12) | Morpholine (5 vol. percent) | Slightly turbid. |
| (13) | Nitromethane (3 vol. percent) | Do. |

Example 10

An autoclave having iron rust on its inside wall was charged with dimethylformamide and various additives in the amounts hereinafter indicated. While maintaining a temperature of 155° C., a $C_5$-hydrocarbon fraction of the following composition was introduced to a gauge pressure of 3.0 kg./cm.$^2$.

|  | | Percent |
|---|---|---|
| n-Pentane | mol | 24.35 |
| i-Pentane | Do | 15.02 |
| Isoprene | Do | 15.08 |
| 2-methylbutene-1 | Do | 6.71 |
| Pentene-1 | Do | 5.61 |
| Trans-1,3-pentadiene | Do | 5.35 |
| Cyclopentadiene | Do | 4.58 |
| Trans-pentene-2 | Do | 3.83 |
| 2-methylbutene-2 | Do | 3.32 |
| Cis-1,3-pentadiene | Do | 3.06 |
| Cyclopentene | Do | 2.61 |
| Cis-pentene-2 | Do | 2.27 |
| 1,4-pentadiene | Do | 1.46 |
| 2-methylbutene-1 | Do | 1.13 |
| Cyclopentane | Do | 0.96 |
| Acetylenes (calcd. as α-acetylene) | p.p.m. | 600 |

The mixtures were in contact with the iron dust. After 48 hours, the states of the solutions were observed with the following results.

| Sample No. | Additive | State of Solution |
|---|---|---|
| (1) | None | Large amount of polymer separated. |
| (2) | Cinnamic aldehyde (5 vol. percent) | Slightly turbid. |
| (3) | Aldol (5 vol. percent) | Practically transparent. |
| (4) | α-Cyanoethylacrylonitrile (3 vol. percent) | Transparent. |
| (5) | Thiophenol (1 vol. percent) | Do. |
| (6) | Nitromethane (1 vol. percent) | Practically transparent. |
| (7) | α-Nitroso-β-naphthol (10,000 p.p.m.) | Transparent. |
| (8) | Isatin (5,000 p.p.m.) | Slightly turbid. |
| (9) | Morpholine (5 vol. percent) | Do. |

Example 11

An autoclave having iron rust on its inside wall was charged with dimethylformamide and various additives in the amounts hereinafter indicated. While maintaining a temperature of 150° C., a gas mixture of 90% by volume of isoprene and 10% by volume of vinyl acetylene was introduced to a gauge pressure of 3.0 kg./cm.$^2$. After 48 hours, the states of the solutions were observed with the following results.

| Sample No. | Additive | State of Solution |
|---|---|---|
| (1) | None | Large amount of polymer separated. |
| (2) | Sodium nitrite (200 p.p.m.) | Polymer separated. |
| (3) | Hydroquinone (500 p.p.m.) | Do. |
| (4) | Sulfur (500 p.p.m.) | Do. |
| (5) | Methylene Blue (500 p.p.m.) | Do. |
| (6) | Thiophenol (1 vol. percent) | Transparent. |
| (7) | Methacrylonitrile (5 vol. percent) | Slightly turbid. |
| (8) | Nitromethane (3 vol. percent) | Practically transparent. |
| (9) | α-Nitroso-β-naphthol (10,000 p.p.m.) | Do. |
| (10) | Cinnamic aldehyde (5 vol. percent); Sodium nitrite (200 p.p.m.) | Do. |
| (11) | Aldol (5 vol. percent); Sodium nitrite (200 p.p.m.) | Slightly turbid. |
| (12) | Isatin (10,000 p.p.m.); Hydroquinone (500 p.p.m.) | Practically transparent. |
| (13) | Morpholine (5 vol. percent); Sulfur (500 p.p.m.) | Do. |
| (14) | Nitroethane (3 vol. percent); Methylene Blue (500 p.p.m.) | Transparent. |

Example 4

The same conditions as in Example 3 were used to evaluate the joint use of two compounds selected from the polymerization inhibitors of the present invention. The results are set forth below.

| Sample No. | Additive | State of Solution |
|---|---|---|
| (1) | Cinnamic aldehyde (3 vol. percent); α-Nitroso-β-naphthol (5,000 p.p.m.). | Slightly turbid. |
| (2) | Aldol (3 vol. percent); Methacrylonitrile (2 vol. percent). | Do. |
| (3) | Aldol (3 vol. percent); Nitroethane (2 vol. percent). | Do. |
| (4) | α-Cyanoethylacrylonitrile (1 vol. percent); α-Nitroso-β-naphthol (5,000 p.p.m.). | Practically transparent. |
| (5) | α-Cyanoethylacrylonitrile (1 vol. percent); 2-nitropropane (1 vol. percent). | Slightly turbid. |
| (6) | α-Cyanoethylacrylonitrile (1 vol. percent); Isatin (3,000 p.p.m.). | Practically transparent. |
| (7) | Morpholine (3 vol. percent); Thiosalicylic acid (5,000 p.p.m.). | Transparent. |
| (8) | Morpholine (3 vol. percent); Methacrylonitrile (2 vol. percent). | Slightly turbid. |
| (9) | Nitromethane (1 vol. percent); Isatin (5,000 p.p.m.). | Transparent. |
| (10) | Isatin (3,000 p.p.m.); Morpholine (3 vol. percent). | Practically transparent. |
| (11) | Isatin; α-Nitroso-β-naphthol (5,000 p.p.m.). | Slightly turbid. |

Example 5

The autoclave used in Example 3 was charged with dimethylformamide and various additives in the amounts hereinafter indicated. Then, while maintaining a temperature of 155° C., isoprene was introduced to a gauge pressure of 3.5 kg./cm.$^2$. The mixtures were in contact with the iron rust. After 48 hours, the states of the solutions were observed with the following results.

| Sample No. | Additive | State of Solution |
|---|---|---|
| (1) | None | Large amount of polymer separated. |
| (2) | Sodium nitrite (200 p.p.m.) | Polymer separated. |
| (3) | Sulfur (500 p.p.m.) | Large amount of polymer separated. |
| (4) | Hydroquinone (500 p.p.m.) | Do. |
| (5) | Methylene Blue (500 p.p.m.) | Do. |
| (6) | β-Naphthyl amine (500 p.p.m.) | Do. |
| (7) | 4-t-butylcatechol (500 p.p.m.) | Do. |
| (8) | α-Cyanoethylacrylonitrile (1 vol. percent) | Slightly turbid. |
| (9) | Thiosalicylic acid (5,000 p.p.m.) | Practically transparent. |
| (10) | Nitromethane (1 vol. percent) | Transparent. |
| (11) | α-Nitroso-β-naphthol (10,000 p.p.m.) | Turbid but no separation of polymer. |
| (12) | Aldol (5 vol. percent); Sulfur (500 p.p.m.) | Turbid. |
| (13) | Isatin (5,000 p.p.m.); 4-t-butyl catechol (500 p.p.m.) | Practically transparent. |
| (14) | Morpholine (1 vol. percent); Sodium nitrite (200 p.p.m.) | Transparent. |

Example 6

An autoclave having iron rust on its inside wall was charged with dimethylformamide and various additives in the amounts hereinafter indicated, while maintaining a temperature of 155° C., 1,3-pentadiene (67:33 (by weight) trans-1,3-pentadiene/cis-1,3-pentadiene) was introduced to a gauge pressure of 3 kg./cm.$^2$. The mixtures were in contact with the iron rust. After 20 hours, the states of the solutions were observed with the following results.

| Sample No. | Additive | State of Solution |
|---|---|---|
| (1) | None | Large amount of polymer separated. |
| (2) | Sodium nitrite (200 p.p.m.) | Polymer separated. |
| (3) | Sulfur (500 p.p.m.) | Do. |
| (4) | Hydroquinone (500 p.p.m.) | Do. |
| (5) | α-Nitroso-β-naphthol (10,000 p.p.m.) | Transparent. |
| (6) | Isatin (10,000 p.p.m.) | Do. |
| (7) | Methacrylonitrile (5 vol. percent) | Practically transparent. |
| (8) | α-Cyanoethylacrylonitrile (1 vol. percent) | Transparent. |
| (9) | Thiosalicylic acid (5,000 p.p.m.) | Do. |
| (10) | Nitromethane (1 vol. percent) | Slightly turbid. |

Example 7

The autoclave used in the preceding examples was charged with dimethylformamide and various additives in the amounts hereinafter indicated. While maintaining a temperature of 125° C., a hydrocarbon mixture consisting of 40% by volume of butadiene, 30% by volume of isoprene and 30% by volume of 1,3-pentadiene (which consists of 67% by weight of trans-1,3-pentadiene and 33% by weight of cis-1,3-pentadiene) is introduced to a gauge pressure of 5.0 kg./cm$^2$. After 48 hours, the states of the solutions were observed with the following results.

| Sample No. | Additive | State of Solution |
|---|---|---|
| (1) | None | Polymer separated. |
| (2) | Sodium nitrite (200 p.p.m.) | Turbid. |
| (3) | Hydroquinone (500 p.p.m.) | Polymer separated. |
| (4) | Methylene Blue (500 p.p.m.) | Do. |
| (5) | 4-t-butylcatechol (500 p.p.m.) | Do. |
| (6) | α-Cyanoethylacrylonitrile (5 vol. percent) | Transparent. |
| (7) | Nitroethane (1 vol. percent) | Do. |
| (8) | α-Nitroso-β-naphthol (1,000 p.p.m.); Hydroquinone (500 p.p.m.) | Do. |
| (9) | Thiosalicylic acid (5,000 p.p.m.); Methylene Blue (500 p.p.m.) | Do. |

What we claim is:

1. A method of reducing the tendency of a conjugated diene to polymerize in a polar solvent solution exposed to elevated temperatures, said method comprising adding to the solution at least one polymerization inhibitor selected from the group consisting of $\alpha,\beta$-unsaturated nitriles, aliphatic nitro compounds, aromatic mercaptans, cinnamic aldehyde, aldol, $\alpha$-nitroso-$\beta$-naphthol, isatin and morpholine in an amount of 0.01 to 10% by weight based on the solvent of the solution.

2. A method according to claim 1, wherein said conjugated diene is butadiene, isoprene, 1,3-pentadiene or a mixture thereof.

3. A method according to claim 1, wherein said conjugated diene is in the form of a $C_4$- or $C_5$-hydrocarbon fraction.

4. A method according to claim 1 wherein the polar solvent is acetonitrile, dimethylformamide, acetone or N-methylpyrrolidone.

5. A method according to claim 1, wherein said polymerization inhibitor is added in an amount of 0.05 to 5% by weight based on the solvent of the solution.

6. A method according to claim 1, wherein the $\alpha,\beta$-unsaturated nitrile is a compound of the formula $$R_1CH=C(R_2)CN$$

wherein $R_1$ is hydrogen, phenyl, a $C_1$–$C_6$-alkyl or $C_1$–$C_6$-alkenyl group, and $R_2$ is hydrogen or a $C_1$–$C_4$-alkyl group which may be substituted with a cyano, nitro, mercapto or hydroxy group.

7. A method according to claim 1, wherein the aliphatic nitro compound is a compound of the formula $$R_3-NO_2$$

wherein $R_3$ is a $C_1$–$C_8$-alkyl or a $C_1$–$C_8$-alkenyl group.

8. A method according to claim 1, wherein the aromatic mercaptan is a compound of the formula

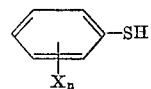

wherein X is $NH_2$, halogen, COOH, $COOR_4$, $OCH_3$, SH, $NO_2$ or a $C_1$–$C_4$-alkyl group, $n$ is an integer of 0 to 2 and $R_4$ is a $C_1$–$C_4$ alkyl group.

9. A method according to claim 1, wherein, in addition to the said polymerization inhibitor, there is also added an inhibitor selected from the group consisting of sodium nitrite, methylene blue, sulphur, tertiary butyl catechol, $\beta$-naphthyl amine, furfural, benzaldehyde and aromatic nitro compounds.

References Cited
UNITED STATES PATENTS

| | | | |
|---|---|---|---|
| 2,402,806 | 6/1946 | Durland | 260—666.5 |
| 2,449,010 | 9/1948 | Robey et al. | 260—666.5 |
| 2,478,710 | 8/1949 | Robey | 260—666.5 |
| 2,557,684 | 6/1951 | Powers | 260—666.5 X |
| 2,787,634 | 4/1957 | Coover et al. | 260—666.5 X |
| 2,809,155 | 10/1957 | Buehler | 260—666.5 X |
| 2,810,765 | 10/1957 | Neuworth et al. | 260—609 |
| 2,888,386 | 5/1959 | Brower | 260—666.5 |
| 3,309,412 | 3/1967 | Sakuragi et al. | 260—666.5 |

DELBERT E. GANTZ, *Primary Examiner.*

G. E. SCHMITKONS, *Assistant Examiner.*